United States Patent [19]

Profenna et al.

[11] 4,087,009

[45] May 2, 1978

[54] BACKHOE FRAME

[75] Inventors: Leonardo C. Profenna, Huntington Woods; James L. Campbell, Westland, both of Mich.

[73] Assignee: Massey-Ferguson Inc., Detroit, Mich.

[21] Appl. No.: 672,821

[22] Filed: Apr. 1, 1976

[51] Int. Cl.² .............................................. E02F 3/72
[52] U.S. Cl. .................................. 214/131 A; 172/272
[58] Field of Search .......... 214/131 A, 138 D, 138 E, 214/138 F, 138 G, 138 R; 172/272, 273, 753, 804, 805

[56] References Cited

U.S. PATENT DOCUMENTS

| | | | |
|---|---|---|---|
| 2,931,525 | 4/1960 | Davis | 214/131 A |
| 3,081,891 | 3/1963 | Przybylski | 214/131 A |
| 3,330,420 | 7/1967 | Walker | 214/138 F |
| 3,771,677 | 11/1973 | Pilch | 214/131 A |
| 3,822,751 | 7/1974 | Waterman | 172/804 |
| 3,844,425 | 10/1974 | Bailey | 214/131 A |

*Primary Examiner*—Drayton E. Hoffman
*Assistant Examiner*—Ross Weaver
*Attorney, Agent, or Firm*—Thomas P. Lewandowski

[57] ABSTRACT

A mounting structure for detachably connecting a backhoe to the rear of a tractor comprising a unitary frame forming a vertical pivot for the backhoe and having attaching members located at the underside of the tractor to receive connecting elements all of which are disposed in a common horizontal plane and form the sole connection between the vehicle and backhoe.

10 Claims, 8 Drawing Figures

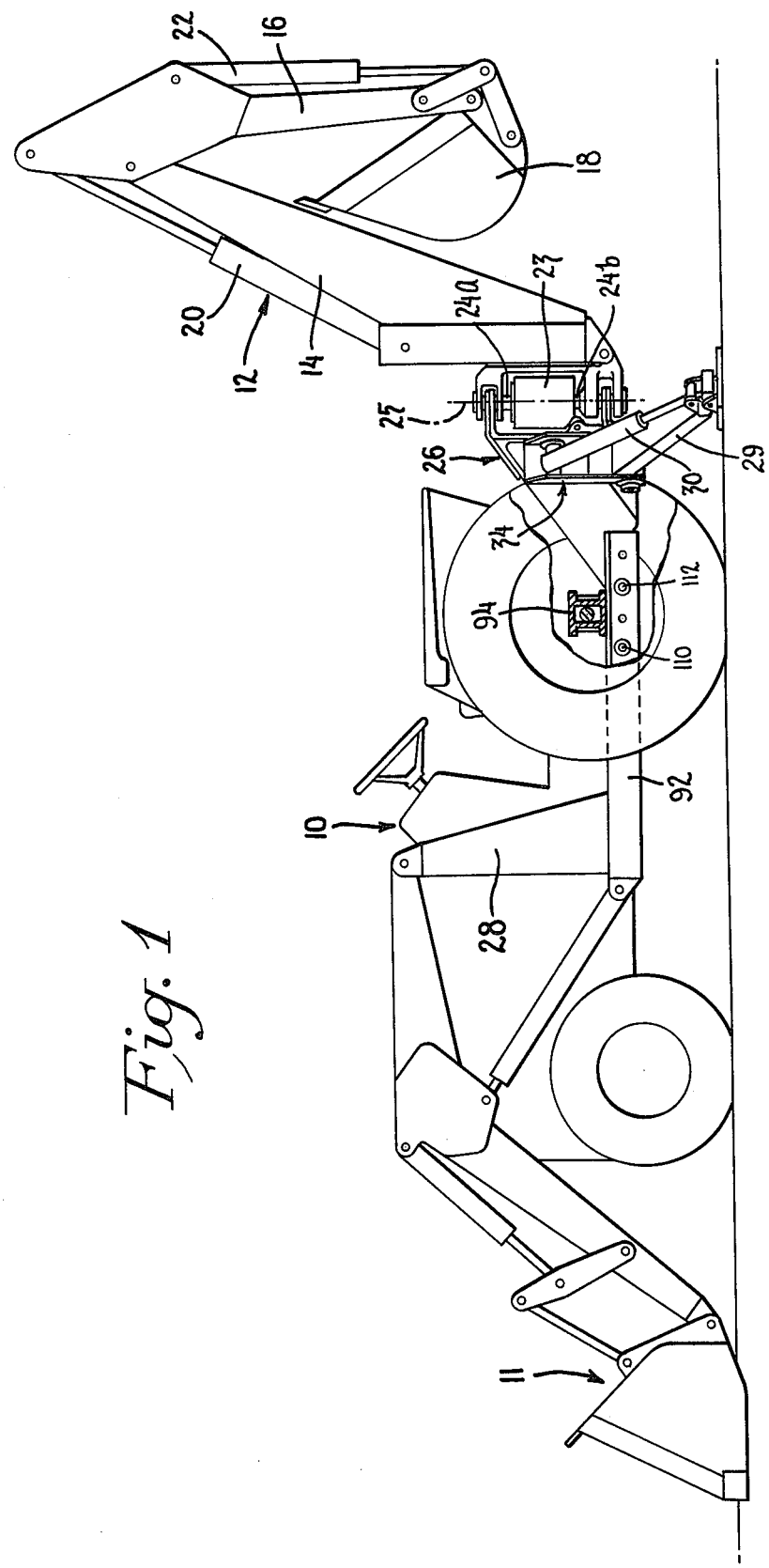

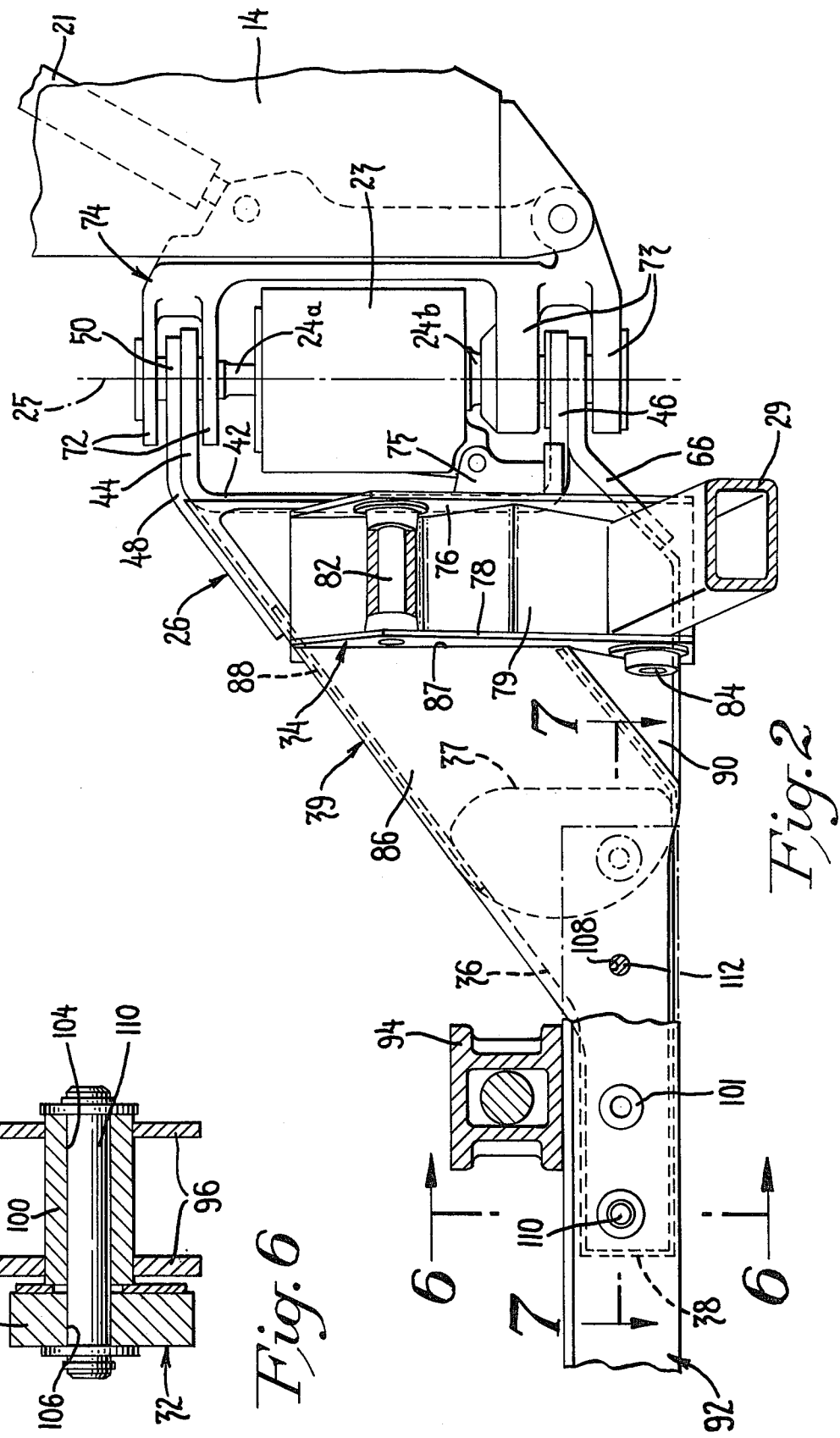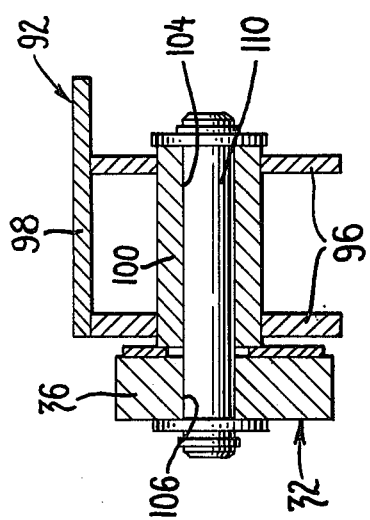

BACKHOE FRAME

This invention relates to vehicle mounted load handling equipment such as backhoes and particularly to a mounting structure for supporting such load handling equipment on a vehicle.

Load handling equipment such as backhoes are frequently permanently mounted on the rear of a vehicle such as a tractor although more frequently such equipment is detachably mounted so it can be removed and the tractor used for other purposes. Mounting structures for such equipment must be massive and rigid to accommodate the large loads and forces imposed during load and earth moving operations. Prior art structures for detachably supporting backhoes on tractors usually have incorporated pairs of upper and lower longitudinal linkages extending from the backhoe for connection to upper and lower points on the tractor. Such mounting arrangements have been unduly complicated in order to insure rigid attachment and as a consequence attachment and detachment is extremely difficult because of the necessity of alignment of several attaching points transversely and vertically spaced on the tractor. Such mounting arrangements often obstruct the operators station and also the passage of various hydraulic hoses which extend from the vehicle hydraulic system to the various hydraulic actuators on the backhoe. Furthermore, such movable linkages usually extend below the tractor axle and frame and limit the ground clearance of the vehicle. Not only are the various movable links, usually four in number, difficult to align, but because of the possible relative movement, a rigid connection is difficult to maintain. Connections of this type require the backhoe to be located farther rearwardly of the tractor than is desirable for good weight distribution during both operation and transport of the backhoe.

It is an object of the invention to provide a mounting structure for backhoes which permits a backhoe to be readily attached and detached from a vehicle such as a tractor.

Still another object of the invention is to provide a simplified mounting structure for backhoes in the form of a frame in which the sole points of connection to the vehicle are disposed in a common horizontal plane facilitating easy attachment and detachment.

Another object of the invention is to provide a mounting structure for backhoes in which the backhoe is supported in close, adjacent relationship to the rear of the vehicle for improved weight distribution during both transport and operation.

A backhoe frame for mounting the backhoe on the tractor has been provided in which the frame includes a pair of side members rigidly connected to a supporting structure which also forms the pivot for the backhoe. The side members which are located in a common horizontal plane are adapted for ready attachment and detachment to the frame of the vehicle and form the sole support for the backhoe. Such mounting makes it possible to locate the backhoe in close adjacent relationship to the rear of the tractor for good weight distribution. The frame itself is a single rigid structure of box-like construction to afford both longitudinal and transverse rigidity.

FIG. 1 is a side elevation of a tractor mounting a backhoe and a front end loader;

FIG. 2 is a side view at an enlarged scale of the supporting frame structure for the backhoe with adjacent portions of the backhoe and front end loader also indicated;

FIG. 6 is a sectional view taken on line 6—6 in FIG. 2;

Figure 3:
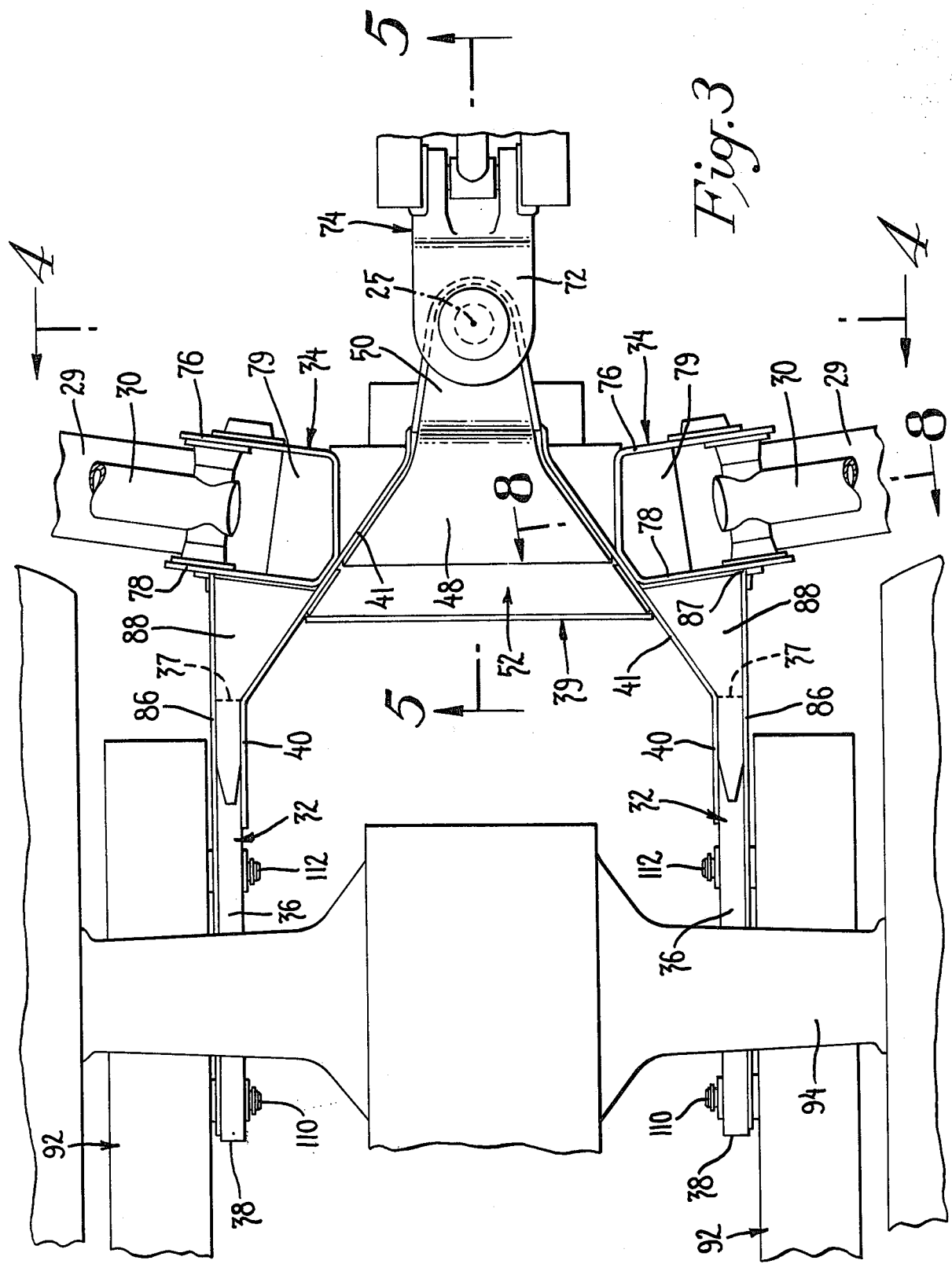
FIG. 3 is a top view of the mounting frame structure for the backhoe shown in association with a tractor.
Figure 4:
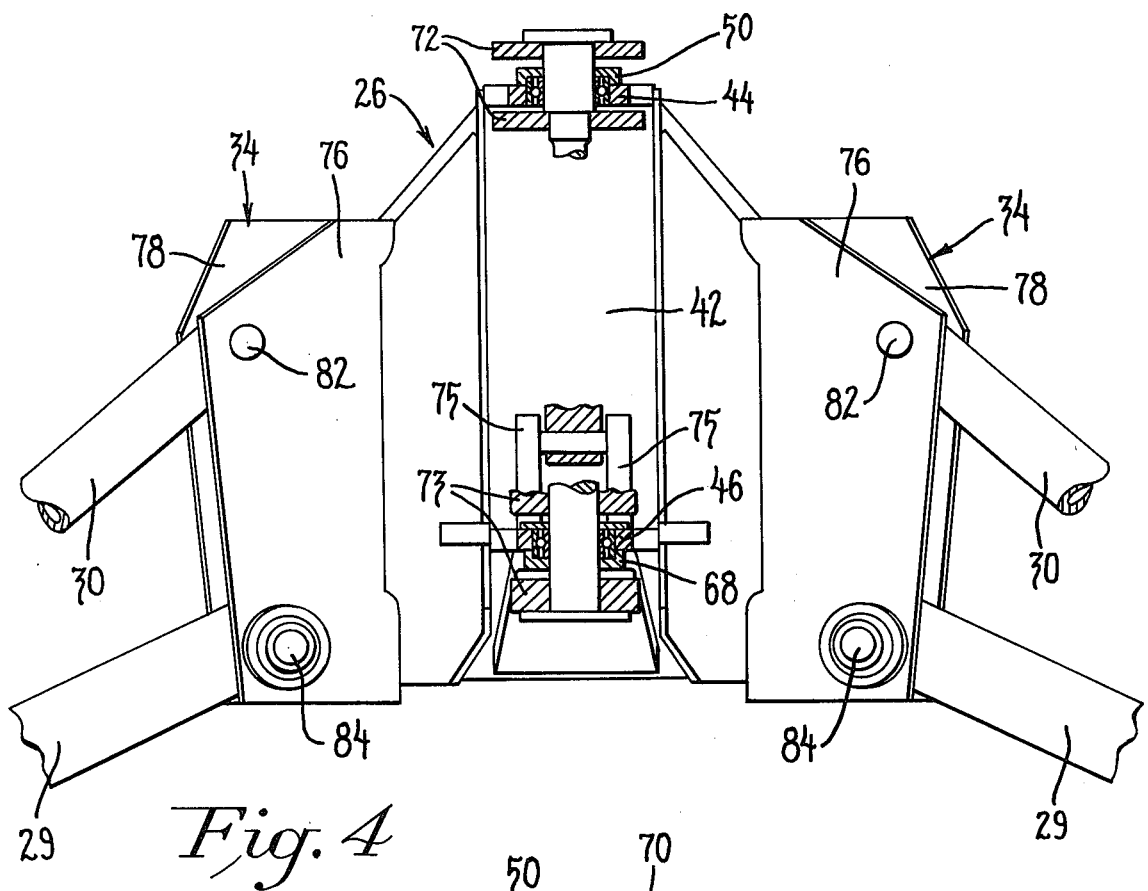
FIG. 4 is a view of the backhoe mounting structure partially in section taken on line 4—4 in FIG. 3.

Referring to the drawings and particularly to FIG. 1, the equipment includes a tractor 10 supporting a front end loader 11 and a backhoe 12. The backhoe has a boom 14, a dip stick 16 and a bucket 18. The angular position of the boom 14 and dip stick 16 and the angular relationship of the bucket 18 and the dip stick 16 may be changed relative to each other by actuating hydraulic cylinders 20 and 22 under the control of hand operated valves at the operators station. In addition, the entire backhoe structure 12 can be manipulated through a rotary actuator 23 to swing the boom 14 to either side of the tractor around a vertical pivot axis 25 formed by the pins 24a and 24b. The backhoe 12 and the pins 24a and 24b are supported relative to the tractor by a mounting frame structure 26 embodying the invention.

The frame 26 preferably is detachably mounted to a mounting frame 28 of the front end loader 11 which extends to the rear portion of the tractor. The frame 26 supports the pins 24a and 24b vertically for the purpose of swinging movement of the backhoe in a horizontal arc to either side of the tractor. In addition, the frame 26 supports ground engaging stabilizers 29 which are movable between the ground engaging position shown in FIG. 1 and a transport position by means of hydraulic actuators 30 under the control of the operator.

In general, the frame 26 is a weldment which as viewed from the top as seen in FIG. 3, is forked with a pair of generally parallel side members 32, the rearward ends of which merge with a support structure having portions converging rearwardly of the tractor and forming the vertical axis 25 for the pins 24a and 24b. Stabilizer mounting brackets 34 are formed integrally with the converging portions of the frame at opposite sides thereof to support the stabilizers 29 and the hydraulic actuators 30.

Figure 5:
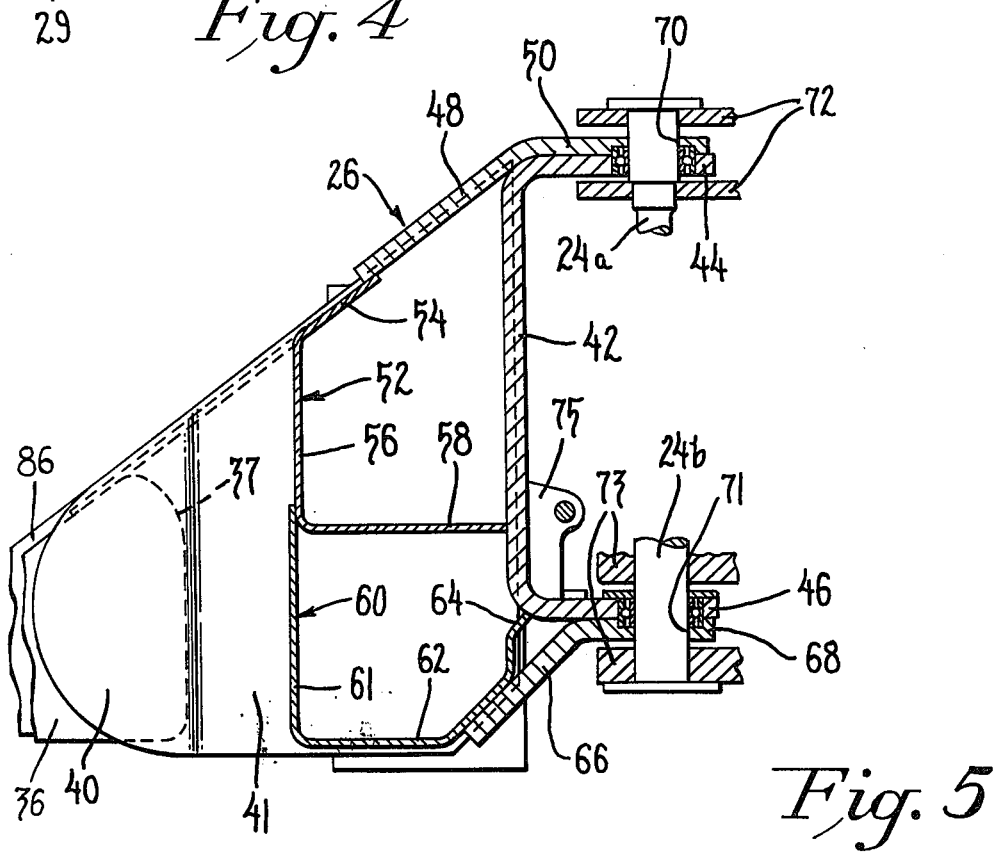
FIG. 5 is a sectional view of the mounting frame structure taken on line 5—5 in FIG. 3.

More specifically, and as best seen in FIGS. 2 and 3, the frame 26 includes a pair of identical side mounting bars 36 each of which are made of relatively thick metal and have a substantially larger vertical dimension at their rearward ends as indicated at 37 than at their forward ends 38. A support structure 39 is connected to the side members 32 and is formed by inner side plates 40 welded to the rearward end portion 37 of each of the side mounting bars 36 with portions 41 projecting beyond the ends of the mounting bars 36 and converging towards each other. Adjacent their rearward ends, the converging portions 41 abut and are welded to a pin support bracket 42 which as viewed in FIG. 2 is generally U-shaped in construction with leg portions 44 and 46 forming the upper and lower support respectively, for the vertical pins 24a and 24b. A reenforcing plate 48 overlies the rearward portion of the converging portions 41 of the side plates 40 and is welded thereto so that a rearward projecting portion 50 overlies the upper leg 44 of the support bracket 42. The converging portions 41 are further reenforced and held in spaced apart converging relationship by a transversely disposed upper reenforcing member 52 which as seen in FIG. 5 has an inclined portion 54 conforming to the upper edge of the inner side plates 40 and a vertical wall portion 56 merging with a horizontal plate 58, the rearward edge of which is fastened to the pin support bracket 42 as by welding. A second reenforcing member 60 has a vertical wall 61 abutting the reenforcing member 52 and a horizontal base 62, the rearward portion of which is bent upwardly so that a rearward edge 64 abuts the pin support bracket 42. A bottom bracket 66 extends upwardly from the reenforcing member 60 and has a portion 68 in underlying relationship to the lower leg 46 of the pin support bracket 42.

As will be noted, the legs 44 and 46 of the support bracket 42 are reenforced by the members 50 and 68 and aligned openings 70 and 71 are formed to receive and form the pivot for the backhoe pins 24a and 24b.

The backhoe pins 24a and 24b which rotate in the openings 70 and 71 of the bracket 42 are fixed at the upper end by the shaft 24a by a pair of upper lugs 72 disposed at opposite sides of the leg 44 and a pair of lower lugs 73 fixed to a lower portion of the pin 24b and disposed at opposite sides of the leg 46 of the bracket 42. The lugs 72 and 73 form part of the backhoe pivot structure 74 to which the boom 14 and hydraulic cylinder 21 are directly connected. To swing the backhoe 12 in a horizontal arc about the vertical axis 25, the hydraulic actuator 23 is drivingly connected to the pin 24b and is anchored to a bracket structure 75 forming a part of the frame 26.

Figure 8:
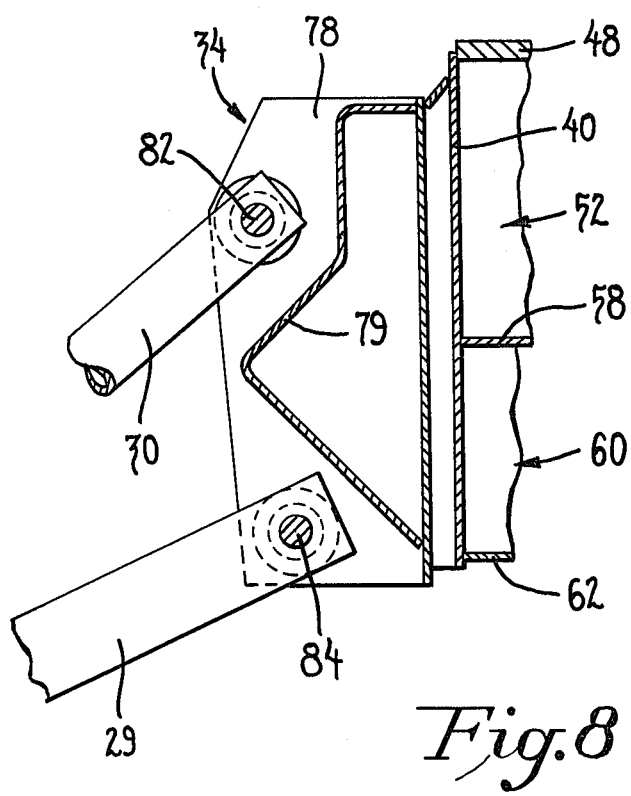
FIG. 8 is a sectional view taken generally on line 8—8 in FIG. 3.

In FIGS. 2 and 3 the pair of stabilizer mounting brackets 34 are mounted at opposite sides of the frame 26 in a generally vertical position. Each of the brackets 34 has a generally channel shaped cross section with spaced apart leg portions 76 and 78. An irregular shaped reenforcing plate 79 best seen in FIG. 8 is disposed between the legs 76 and 78 and is welded thereto to form a generally box-like construction. The legs 76 and 78 support an upper pin 82 and a lower pin 84. The upper pin 82 serves to pivotally support one end of the hydraulic actuator 30 and the lower pin 84 supports one end of a stabilizer 29 so that it may pivot between ground engaging and transport positions.

The stabilizers support brackets 34 are welded to the inner side plates 40 and are further rigidly made integral with the frame 26 by outer side plates 86 which extend for substantially the full length of the side mounting bars 36 with the rearward ends 87 in abutting engagement with the legs 78 of the stabilizer support brackets 74. As seen in FIG. 3, the generally triangular spaces between the upper inclined edges of the inner side plates 41, the outer side plates 86 and the legs 78 of the stabilizer brackets 74 are covered by upper cover plates 88. Similarly, as seen in FIG. 2, the lower inclinded rearward edges of the inner side plates 41 and outer side plates 86 are covered by lower cover plates 90, the edges of which are welded to the inner and outer side plates and the rearward edges of which are welded to the legs 78 of the stabilizer support brackets.

In the construction just described all of the various elements are welded together at their abutting edges to form a rigid, unitary frame having box-like construction in areas adjacent to the vertical axis 25 and adjacent to the stabilizer support bracket 74. The stabilizer support brackets themselves are generally box-like to give great rigidity and strength.

Figure 7:
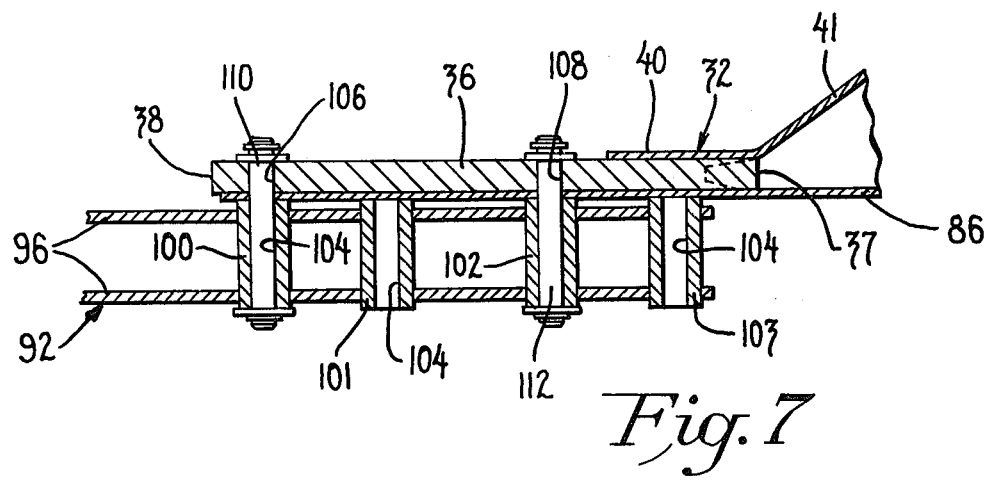
FIG. 7 is a sectional view taken on line 7—7 in FIG. 2.

The support frame structure 26 is detachably mounted to the frame 28 of the front end loader 11. The frame 28 of the front end loader includes a pair of parallel spaced rail members 92 which is seen in FIGS. 1 and 3 extend rearwardly at the underside of the rear axle 94 of the tractor 10. As seen in FIGS. 6 and 7 each of the rails 92 includes a pair of spaced web members 96 which are held in spaced apart relationship by a top wall member 98. The web members 96 are further held in spaced apart relationship by collars 100, 101, 102 and 103. The side members 32 of the frame 26 are provided with a pair of forward openings 106 which are transversely aligned to each other and a pair of rearward openings 108 which are also transversely aligned to each other. The openings 106 and 108 are longitudinally spaced apart in each of the side members 32 to align with similarly spaced openings 104 formed in the collars 100 and 102 or in the collars 101 and 103 as seen in FIG. 7. A pair of pins 110 are adapted to be detachably disposed in the pair of openings 106 and the openings 104 in the associated pair of collars 100 or 101 and a pair of pins 112 are adapted to be detachably mounted in the pair of openings 108 and the associated opening 104 in the pair of collars 102 or 103. The pins 110 and 112 may be in the form of studs, bolts or pins held in place against axial displacement in any well known manner. The collars 100, 101, 102 and 103 protrude to opposite sides of the rail members 92 so that when the pins 110 and 112 are in the form of bolts, tightening will not collapse the rail members 92.

The pair of pins 110 and the pair of pins 112 are the sole connection for the backhoe frame 26 to the tractor 10. Although the connection has been described in terms of attachment to the frame of a front end loader, it will be understood that the rails 92 can be side rails forming a permanent part of the tractor.

The arrangement of the mounting points or holes 106 and 108 is such that they are disposed in a substantially horizontal plane at an underside of the tractor and adjacent to the tractor rear axle so that the frame structure 26 supports backhoe pins 24a and 24b with its axis extending vertically and above the horizontal plane.

To attach the backhoe frame to the tractor it is simply necessary to support the frame 26 in an elevated position which can be accomplished by having the stabilizers 29 and bucket 18 in engagement with the ground and by making temporary hydraulic connections to the tractor hydraulic system to elevate the frame 26. Thereafter, the tractor can be driven rearwardly to bring the openings 106 and 108 into alignment with openings in the collars. After insertion of the pins the frame 26 together with the backhoe 12 is securely supported from the tractor for operation.

Two sets of attaching points or collars are provided for mounting of the frame 26. One set of collars is formed by the collars 100 and 102 and the second set is formed by the collars 101 and 103. The two sets of collars or attaching points make it possible to mount the frame 26 in a selected position longitudinally of the rail members 92 of the front end loader frame 28. This is particularly desirable since the front end loader 28 may be used with tractors of different sizes or lengths and the two sets of attaching points make it possible to select the most desirable set to locate the frame 26 closely adjacent the rear axle 94 of the tractor for good load and weight distribution.

It will be observed that this mounting arrangement places the vertical pivot axis 25 closely adjacent to the rear of the tractor and that the mounting leaves the backhoe and its frame relatively unobstructed to afford greater visibility for the operator and room for hydraulic hoses and controls to pass from the vehicle to the backhoe. The mounting structure is of unitary construction and the sole points of attachment between the backhoe and vehicle are transverse pins disposed in a common plane at the underside of the vehicle.

The embodiments of the invention in which an exclusive property or privilege is claimed are defined as follows:

1. A frame for mounting load handling equipment in combination with a vehicle having laterally spaced apart longitudinally extending frame members, the improvement comprising a pair of laterally spaced apart side members disposed in a common horizontal plane, a support structure rigidly interconnected to the rearward ends of said side members and having portions converging rearwardly to form an integral structure which supports a vertical pivot member, said pivot member being disposed entirely above said horizontal plane and being adapted to support load handling equipment for pivotal movement about a generally vertical axis, and attaching means detachably connecting said laterally spaced apart frame members on said vehicle to said side members to form the sole support for said frame on the vehicle.

2. The combination of claim 1 in which said attaching means include longitudinally spaced connecting points on said side members.

3. The combination of claim 2 in which said connecting points are pin receiving apertures formed by said side members and extending transversely thereof.

4. The combination of claim 1 in which said laterally spaced frame members are provided with a plurality of sets of longitudinally spaced pin receiving openings, said attaching means comprising longitudinal spaced pin receiving openings adapted to align with the pin receiving openings of a selected one of said sets, and pins disposed of in said aligned openings.

5. The combination of claim 1 and further comprising a pair of mounting brackets mounted on said support structure at opposite sides thereof, and stabilizer members mounted on said pair of brackets, respectively, for movement between transport and ground engaging positions.

6. The combination of claim 5 and further comprising reenforcing members formed integrally with said brackets and said support structure and extending forwardly toward said side members.

7. The combination of claim 1 in which support structure includes transverse members between and formed integrally with said converging portions to form a rigid box-like structure adjacent said pivot portion.

8. The combination of claim 1 in which said pivot member is disposed on the center line of said frame and said vehicle.

9. In combination: a tractor; a first load handling assembly mounted on said tractor and having oppositely disposed side frame members extending longitudinally of said tractor and in a common horizontal plane, a second load handling assembly disposed at the rear of said tractor, a mounting frame for mounting the second load handling assembly comprising laterally spaced apart side members disposed in said horizontal plane and a support structure rigidly interconnected to the rearward ends of said side members and having portions converging rearwardly to form an integral structure which supports a vertical pivot portion, said pivot portion being disposed above said horizontal plane and being adapted to support said second load handling assembly for pivotal movement about a generally vertical axis, and attaching means disposed in said horizontal plane and adapted to coact with said laterally spaced frame members on said first load handling assembly and with said side members of the mounting frame for mounting the second load handling assembly to form the sole support for the mounting frame of the second load handling assembly relative to said first load handling assembly.

10. The combination of claim 9 in which said laterally spaced frame members of said first load handling assembly include a plurality of sets of longitudinally spaced pin receiving openings, said attaching means comprising longitudinally spaced pin receiving openings adapted to align with the pin receiving openings of a selected one of said sets, and pins detachably disposed in said aligned openings.

* * * * *